(12) United States Patent
Lambrech et al.

(10) Patent No.: US 9,478,819 B2
(45) Date of Patent: Oct. 25, 2016

(54) HIGH-EFFICIENCY MOLTEN CARBONATE FUEL CELL SYSTEM AND METHOD

(71) Applicant: FuelCell Energy, Inc., Danbury, CT (US)

(72) Inventors: Matthew Lambrech, Sherman, CT (US); Mohammad Farooque, Danbury, CT (US); Carla Juhas, Bethlehem, CT (US); Fred C. Jahnke, Rye, NY (US); Ramakrishnan Venkataraman, Danbury, CT (US); Michael L. Quatannens, Chappaqua, NY (US)

(73) Assignee: FUELCELL ENERGY, INC., Danbury, CT (US)

( * ) Notice: Subject to any disclaimer, the term of this patent is extended or adjusted under 35 U.S.C. 154(b) by 29 days.

(21) Appl. No.: 14/578,077

(22) Filed: Dec. 19, 2014

(65) Prior Publication Data

US 2016/0181647 A1   Jun. 23, 2016

(51) Int. Cl.
| | |
|---|---|
| *H01M 8/06* | (2016.01) |
| *H01M 8/14* | (2006.01) |
| *H01M 8/04* | (2016.01) |
| *H01M 8/24* | (2016.01) |

(52) U.S. Cl.
CPC .......... *H01M 8/141* (2013.01); *H01M 8/0491* (2013.01); *H01M 8/04104* (2013.01); *H01M 8/04156* (2013.01); *H01M 8/249* (2013.01); *H01M 2008/147* (2013.01)

(58) Field of Classification Search
CPC ............. H01M 8/141; H01M 8/0491; H01M 8/04104; H01M 8/04156; H01M 8/249; H01M 2008/147; H01M 8/04; H01M 8/0497; H01M 8/04082; H01M 8/0438; H01M 8/04388; H01M 8/04395; H01M 8/04402; H01M 8/0441

See application file for complete search history.

(56) References Cited

U.S. PATENT DOCUMENTS

| | | | |
|---|---|---|---|
| 5,541,014 A | 7/1996 | Micheli et al. | |
| 6,365,290 B1 | 4/2002 | Ghezel-Ayagh et al. | |
| 8,062,799 B2 | 11/2011 | Jahnke et al. | |
| 8,080,344 B2 | 12/2011 | Skok et al. | |
| 8,236,458 B2 | 8/2012 | Jahnke et al. | |
| 8,367,256 B2 | 2/2013 | Jahnke et al. | |
| 2008/0248349 A1 | 10/2008 | McElroy et al. | |
| 2009/0246564 A1* | 10/2009 | Mogi et al. | 429/13 |
| 2012/0034538 A1 | 2/2012 | Jahnke et al. | |
| 2013/0130139 A1 | 5/2013 | Kah et al. | |

OTHER PUBLICATIONS

International Search Report and Written Opinion in PCT/US2015/066735 dated Feb. 12, 2016 (9 pages).

* cited by examiner

*Primary Examiner* — Raymond Alejandro
(74) *Attorney, Agent, or Firm* — Foley & Lardner, LLP

(57) ABSTRACT

A high efficiency fuel cell system comprising a topping fuel cell assembly comprising a topping cathode portion and a topping anode portion; and a bottoming fuel cell assembly comprising a bottoming cathode portion and a bottoming anode portion, wherein the bottoming anode portion receives anode exhaust output from the topping anode portion and the topping cathode portion receives cathode exhaust from the bottoming cathode portion, and wherein the topping fuel cell assembly has a greater number of fuel cells than the bottoming fuel cell assembly so that the topping fuel cell assembly utilizes more fuel than the bottoming fuel cell assembly.

17 Claims, 4 Drawing Sheets

HIGH-EFFICIENCY MOLTEN CARBONATE FUEL CELL SYSTEM AND METHOD

BACKGROUND OF THE INVENTION

This invention relates to fuel cell power production systems and, in particular, to a multi-stack high-efficiency fuel cell system and method of operating same.

A fuel cell is a device which directly converts chemical energy stored in hydrocarbon fuel into electrical energy by means of an electrical reaction. Generally, a fuel cell comprises an anode and a cathode separated by an electrolyte matrix, which conducts electrically charged ions. In order to produce a useful power level, a number of individual fuel cells are stacked in series with an electrically conductive separator plate between each cell.

In building fuel cell systems, individual fuel cells are stacked together to form a fuel cell stack. The number of fuel cells determines the power rating of the fuel cell stack. To provide systems with higher power ratings, a number of fuel cell stacks are utilized and the outputs of the fuel cell stacks are combined to provide the desired power output. In certain fuel cell systems, the fuel cell stack(s) may be organized in one or more fuel cell stack modules, each of which includes one or more fuel cell stacks housed in an enclosure or a containment structure.

A multi-stack fuel cell system may include a fuel cell stack module with multiple fuel cell stacks housed within a common enclosure. In a system of this design developed for high temperature fuel cell stacks and, in particular, for molten carbonate fuel cell stacks, a box-like containment structure is employed as the enclosure and the fuel cell stacks may be arranged along the length of the containment structure. Each fuel cell stack within the fuel cell module has inlet manifolds for receiving fuel and oxidant gases needed to operate the fuel cell stack and outlet manifolds for outputting spent fuel and oxidant gases as anode and cathode exhausts from the fuel cell stack. The containment structure of the fuel cell module includes fuel and oxidant gas inlet ports that communicate through ducts with the respective fuel and oxidant gas inlet manifolds of the fuel cell stacks, and fuel and oxidant gas outlet ports that communicate through ducts with the oxidant and fuel gas outlet manifolds.

In internally reforming fuel cells, a reforming catalyst is placed within the fuel cell stack to allow direct use of hydrocarbon fuels such as pipe line natural gas, liquefied natural gas (LNG), liquefied petroleum gas (LPG), bio-gas, methane containing coal gas, etc. without the need for expensive and complex external reforming equipment. In an internal reformer, water and heat produced by the fuel cell are used by the reforming reaction, and hydrogen produced by the reforming reaction is used in the fuel cell. The heat produced by the fuel cell reaction supplies heat for the endothermic reforming reaction. Thus, internal reforming is used to cool the fuel cell stack.

Two different types of internally reforming fuel cell designs have been developed and used. The first type of an internally reforming fuel cell is a Direct Internally Reforming (DIR) fuel cell module, in which direct internal reforming is accomplished by placing the reforming catalyst within an active anode compartment of the fuel cell. The advantage of direct internal reforming is that the hydrogen produced through such reforming is provided directly to the anode. A second type of internally reforming fuel cell utilizes Indirect Internal Reforming (IIR), which is accomplished by placing the reforming catalyst in an isolated chamber within the fuel cell stack and routing the reformed gas from this chamber into the anode compartment of the fuel cell. The advantage of indirect internal reforming is that the reforming catalyst is protected from poisoning by the fuel cell's electrolyte. Three types of internally reforming stack designs are possible: (1) incorporates only the DIR, (2) incorporates only IIR, and (3) incorporates both DIR and IIR.

An internally reforming molten carbonate fuel cell system, also called Direct Fuel Cell (DFC), incorporating both the DIR and IIR, has evolved as the choice for environmentally friendly power generation and is the leading commercial option for green power. Carbonate power plants have lower emissions of greenhouse gases and particulate matter than conventional combustion-based power plants. Carbonate power plants emit little NOx gas, SOx gas, or particulate matter. Carbonate power plants have been designated "ultra-clean" by the California Air Resources Board (CARB).

Current carbonate fuel cell power plants are available in 300 kW, 1.4 MW, and 2.8 MW sizes. These plants are installed worldwide and have delivered approximately 2.8 gigawatt-hours of clean electricity as of August, 2014. Current carbonate fuel cell power plants demonstrate electrical conversion efficiencies of 45% to 50% in simple cycle configuration. Carbonate fuel cell power plants operate at high temperatures, approximately 600 C, resulting in byproduct heat at sufficiently high temperature to be utilized for waste heat recycling applications, such as power generation.

Current carbonate fuel cell power plants achieve overall thermal conversion efficiency of 90% (low heat value or LHV) when both high grade and low grade heats are utilized. Such utilization of heat occurs in, for example, hospitals and university dormitories, where hot water heating load is high. However, for most applications, and particularly for larger installations, the heat load is lower. For low heat load applications, the combined cycle configuration consisting of the baseline power plant and waste heat utilization in steam-engine generator systems boosts efficiency by a few percentage points.

U.S. Pat. No. 6,365,290 discloses a fuel cell system, known as a DFC Turbine (DFC-T) system, having an alternate cycle where heat from a carbonate fuel cell is used in a gas turbine. The system of U.S. Pat. No. 6,365,290 achieves electrical conversion efficiency approaching 60%. To achieve this efficiency, the system requires that the turbine size be matched with the available fuel cell heat. Therefore, each size plant requires a unique size turbine. Additionally, this system requires a high temperature air-to-air heat exchanger resulting in material and cost disadvantages.

An alternative system utilizes two fuel cell stacks connected in series with respect to fuel flow, which can boost electrical efficiency. The fuel first flows to a first (topping) stack and anode exhaust from the first stack then flows through a second (bottoming) stack having a similar configuration to the first stack. This two stack system allows improved fuel utilization of approximately 80%, providing approximately 7% higher overall system energy conversion efficiency than a baseline simple cycle fuel cell system. The two stack system is described in the U.S. Pat. Nos. 8,062,799 and 8,236,458. See Table 1 below for a summary of various features of U.S. Pat. Nos. 8,062,799 and 8,236,458.

TABLE 1

| Features | U.S. Pat. No. 8,062,799 | U.S. Pat. No. 8,236,458 |
| --- | --- | --- |
| Dual stacks: first stack receives oxidant from second stack and second stack receives fuel from first stack. | X | X |
| Controlled bypass of fresh fuel from first stack to second stack. | X | X |
| First and second stacks are IIR and DIR, respectively. | X | |
| First stack is IIR and DIR and second stack is DIR. | | X |
| Carbond monoxide shifting, water recovery, and methanation of first anode exhaust. | X | X |
| Oxidizer output (oxidizes second stack anode exhaust with fresh and feeds to the second stack) is partly bypassed to the first stack. | | X |
| Anode booster blower for anode side pressure control. | | X |

FIG. 1 shows a conventional fuel cell system as described in the '458 patent, which outputs partially-spent fuel exhaust from a topping fuel cell stack A to a bottoming fuel cell stack B. The stack A includes a first cathode side 100 and a first anode side 105. The stack B includes a second cathode side 110 and a second anode side 115. The first anode side 105 is coupled to an anode booster blower 120 which increases the pressure of the hydrogen rich exhaust from the first anode side 105 of the topping stack A and conveys it to the second anode side 115 of the bottoming stack B. The stack B may be supplemented with fresh fuel from a fuel source to increase electrical power generation by the stack B. Since the stack A runs most efficiently on fuel utilization of 65% to 75%, the stack B is supplied with 25% to 35% of the original fuel, thus requiring input of additional fresh fuel to the stack B from the fuel source.

Utilizing the above-described fuel cell system, heat and mass studies indicate that fuel utilization in the stack B needs to be restricted to about 60% to 70% due to thermal balance considerations. These studies also indicate that overall fuel utilization needs to be restricted to approximately 80% for thermal management considerations. Therefore, such a system achieves an overall system efficiency of approximately 55% (LHV) on pipeline natural gas with current fuel cell stacks.

SUMMARY OF THE INVENTION

It is an objective of the present invention to provide a cost-effective, modular fuel cell system, in which higher overall fuel utilization greater than 80% and higher electrical and conversion system efficiency greater than 55% are achieved while maintaining thermal balance within the fuel cells.

It is also an objective of the present invention to provide a fuel cell system in which partially spent fuel from the exhaust of a topping fuel cell module(s) is supplied to a bottoming fuel cell module(s).

It is a further objective of the present invention to provide a fuel cell system in which the fuel utilization in the topping and bottoming fuel cell modules is controlled so as to increase the overall fuel utilization and electrical efficiency of the system.

It is yet a further objection of the present invention to provide a cathode pressure booster for increasing the pressure of the cathode exhaust from the bottoming fuel cell module(s) supplied to the topping fuel cell module(s) and to control differential pressure between the anode and cathode streams.

The above and other objectives are achieved by a high efficiency fuel cell system comprising: a topping fuel cell assembly comprising a topping cathode portion and a topping anode portion; and a bottoming fuel cell assembly comprising a bottoming cathode portion and a bottoming anode portion, wherein the bottoming anode portion receives anode exhaust output from the topping anode portion and the topping cathode portion receives cathode exhaust from the bottoming cathode portion, and wherein the topping fuel cell assembly has a greater number of fuel cells than the bottoming fuel cell assembly so that the topping fuel cell assembly utilizes more fuel than the bottoming fuel cell assembly. In certain embodiments, the topping fuel cell assembly comprises a plurality of topping fuel cell modules, each of said topping fuel cell modules including at least one fuel cell stack, and the bottoming fuel cell assembly comprises one or more bottoming fuel cell modules, each of the one or more bottoming fuel cell modules including at least one fuel cell stack, and wherein the number of the topping fuel cell modules is greater than the number of the one or more bottoming fuel cell modules. In some embodiments, each of said topping and bottoming fuel cell modules includes a plurality of fuel cell stacks housed within a common containment structure. During operation the topping fuel cell modules may utilize about ⅔ of fuel content supplied to the high efficiency fuel cell system and the one or more bottoming fuel cell modules receive anode exhaust output from the topping fuel cell modules comprising about ⅓ of the fuel content supplied to the high efficiency fuel cell system. Moreover, the one or more bottoming fuel cell module operate at a lower current density than the topping fuel cell modules.

In some embodiments of the invention, the bottoming anode portion further receives supplemental fuel, and the high efficiency fuel cell system further comprises a controller for controlling the amount of supplemental fuel conveyed to the bottoming anode portion. The controller controls the amount of current generated in the bottoming fuel cell assembly based on the amount of supplemental fuel conveyed to the bottoming anode portion. The controller also controls the amount of current generated in the topping and bottoming fuel cell assemblies so that as operating time of the high efficiency fuel cell system increases, the amount of current generated by the topping fuel cell assemblies decreases and the amount of current generated by the bottoming fuel cell assemblies increases. Moreover, the controller controls the amount of current generated in the bottoming fuel cell assembly based on electricity needs so that the amount of current generated in the bottoming fuel cell assembly is increased when the electricity need increases.

In some embodiments, the high efficiency fuel cell system also includes a water recovery assembly for recovering water from one or more of anode exhaust output from the topping anode portion, anode exhaust output from the bottoming anode portion and cathode exhaust output from the topping cathode portion.

In certain embodiments, the high efficiency fuel cell system further includes one or more of: an anode pressure booster for increasing pressure of the anode exhaust output from the topping anode portion before the anode exhaust is conveyed to the bottoming anode portion; and a cathode pressure booster for increasing pressure of the cathode exhaust output from the bottoming cathode portion before the cathode exhaust is conveyed to the topping cathode portion. The high efficiency fuel cell system also comprises a controller for controlling the operation of the one or more of the anode pressure booster and the cathode pressure booster so as to control differential pressure between anode and cathode gas streams in the topping modules or fuel cell assemblies.

In some embodiments, the topping fuel cell assembly comprises direct internal reforming and the bottoming fuel cell assembly comprises direct internal reforming. The amount and spatial distribution of direct internal reforming catalyst in the fuel cells of the bottoming fuel cell assembly is different from the amount and spatial distribution of direct internal reforming catalyst in the fuel cells of the topping fuel cell assembly. Moreover, a loading density of the direct internal reforming catalyst in the fuel cells of the bottoming fuel cell assembly gradually increases from an anode inlet region to an anode outlet region of the fuel cell. In some embodiments, the topping fuel cell assembly and the bottoming fuel cell assembly comprise indirect internal reforming (IIR) placed between cells in each fuel cell stack. The amount and spatial distribution of indirect internal reforming catalyst in the indirect internal reformers of the bottoming fuel cell assembly is different from the amount and spatial distribution of indirect internal reforming catalyst in the indirect internal reformers of the topping fuel cell assembly. The number of indirect internal reformers in the fuel cells of the bottoming fuel cell assembly is different from the number of indirect internal reformers in the fuel cells of the topping fuel cell assembly.

Each of the fuel cell stacks of the topping and bottoming fuel cell modules include opposing anode inlet and outlet faces and opposing cathode inlet and outlet faces, and have design features to improve thermal uniformity within the fuel cells. These design features include one or more of: (a) each fuel cell stack of the bottoming fuel cell module is configured so as to create a temperature gradient in an area adjacent the cathode inlet face of the fuel cell stack so that the temperature of cathode inlet gas is higher near the anode inlet face of the fuel cell stack than near the anode outlet face of the fuel cell stack; (b) each fuel cell stack of the bottoming fuel cell module is configured so as to create a temperature gradient in an area adjacent the anode inlet face of the fuel cell stack so that the temperature of anode inlet gas is higher near the cathode inlet face of the fuel cell stack than near the cathode outlet face of the stack; and (c) each fuel cell stack of the topping fuel cell module is configured so as to create a temperature gradient in an area adjacent the cathode inlet face of the fuel cell stack so that the temperature of cathode inlet gas is higher near the anode outlet face of the fuel cell stack than near the anode inlet face of the fuel cell stack. In such cases, the temperature gradient is between 10 and 20 degrees F.; and/or each fuel cell stack includes one or more appropriately placed baffles for controlling gas flow so as to form the temperature gradient.

In certain embodiments, the bottoming fuel cell assembly comprises a heat exchanger for heating air using heat from both the exhaust output of the bottoming cathode portion and the anode exhaust oxidizer assembly for use in the bottoming cathode portion. The high efficiency fuel cell system further comprises a controller for adjusting the amount of air supplied to the heat exchanger so as to control the temperature of the cathode exhaust output from the bottoming cathode portion that is conveyed to the topping cathode portion.

A method for generating electricity with high efficiency using a high efficiency fuel cell system having the above features is further described below.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
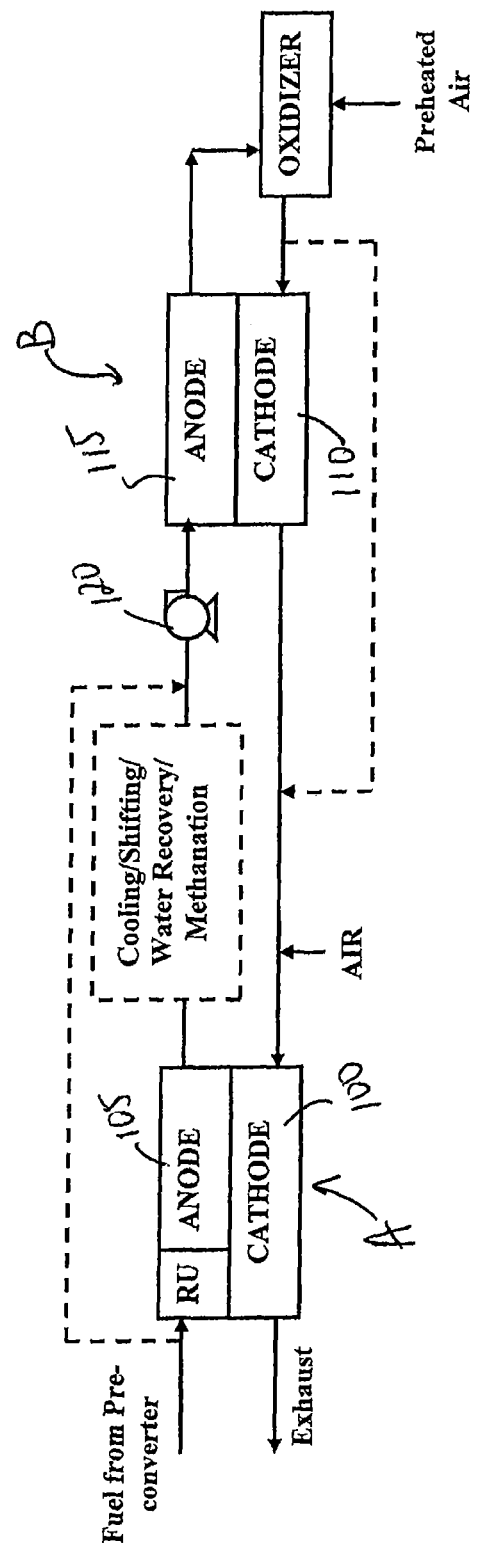
FIG. 1 shows a conventional fuel cell system.

As shown and described below, the present invention provides a cost-effective, modular fuel cell system, in which higher overall fuel utilization and higher electrical power output and conversion system efficiency are achieved while maintaining thermal balance within the fuel cells. In accordance with the present invention, the fuel cell system includes a plurality of fuel cell stacks or a plurality of fuel cell stack modules including topping stack(s) or topping stack module(s) and bottoming stack(s) or bottoming stack module(s), and wherein the topping stack(s)/module(s) receive fresh fuel and partially spent fuel from the exhaust of the topping fuel cell stack(s)/module(s) is supplied to the bottoming fuel cell stack(s)/module(s). In the configuration of the system of the present invention, fuel utilization in the topping and bottoming fuel cell stacks/modules are controlled within desired limits while still increasing the overall fuel utilization and electrical efficiency of the system. Specifically, the size and fuel utilization of the topping fuel cell stack(s)/module(s) is made greater than the size of the bottoming fuel cell stack(s)/module(s). In certain embodiments of the invention, the system includes a topping fuel cell stack or module with two or more stacks and a bottoming fuel cell stack or module with two or more stacks, wherein the topping fuel cell stack has a greater number of fuel cells stacked in series than the bottoming fuel cell stack so that the topping stack utilizes more fuel in the fuel feed than the bottoming stack. In other embodiments of the invention, the system includes multiple topping fuel cell modules and one or more bottoming fuel cell modules, wherein each fuel cell module comprises two or more fuel cell stacks, and the number of topping fuel cell modules is greater than the number of bottoming fuel cell modules. In some embodiments, the topping fuel cell stack/modules consume about two thirds of the fuel and the bottoming fuel cell stack(s)/module(s) consume the remaining about one third of the fuel in the fuel feed. The bottoming fuel cell stack(s)/module(s) may receive additional fresh fuel, which may be premixed with water vapor or may be dry fuel. In addition, the current density in the bottoming fuel cell stack(s)/module(s) is lower than the current density in the topping fuel cell stack/modules.

In the present invention, current generated in the topping stack(s)/module(s) and in the bottoming stack(s)/module(s) is controlled over operating time of the system. Specifically, over time, current generated in the topping stack(s)/module(s) is reduced while current generated in the bottoming stack(s)/module(s) is increased. In the bottoming stack(s)/module(s), current generated is changed based on the amount of methane or other fresh fuel supplied to the bottoming stack(s)/module(s). Moreover, current generated in the bottoming stack(s)/module(s) may be adjustable to adapt to customer needs for heat and electricity. For example, when the customer need for electricity is greater, the output of the bottoming stack(s)/module(s) is increased. In addition, anode exhaust oxidizer that oxidizes anode exhaust output from the bottoming stack(s)/module(s) may include design features that allow the processing of the anode exhaust from the bottoming stack(s)/module(s) at various output levels of the bottoming module. For example, when the bottoming stack(s)/module(s) generate less power, there will be more excess fuel supplied in the anode exhaust to the anode exhaust oxidizer, and thus, the anode exhaust oxidizer is designed to be capable of handling large amounts of unutilized fuel. In certain embodiments, the system may be adapted to use the heat in the plant exhaust of the high efficiency fuel cell system for heating the high pressure natural gas from a gas distribution system in an Energy Recovery Generation System before pressure is let down through a turbine. Use of heat from the fuel cell power plant for heating the high pressure natural gas from a gas distribution system is discussed in U.S. Pat. No. 8,080,344, assigned to the same assignee herein.

As also described below, the pressure of the anode exhaust from the topping fuel cell stack(s)/module(s) supplied to the bottoming fuel cell stack(s)/module(s) may be controlled using an anode pressure booster, and the pressure of the cathode exhaust from the bottoming fuel cell stack(s)/module(s) supplied to the topping fuel cell stack(s)/module(s) may be controlled using a cathode pressure booster. In this way, the pressure differential between the anode and cathode streams in the topping module may be controlled using the anode pressure booster and/or the cathode pressure booster.

The present invention further provides improved thermal uniformity in the fuel cells of the system, particularly in the fuel cells of the bottoming stack(s)/module(s). In some embodiments, the cells in the bottoming stack(s)/module(s) use a different amount and a different distribution of direct internal reforming (DIR) catalyst than the cells in the topping stack(s)/module(s) in order to improve thermal uniformity of the cells in the bottoming stack(s)/module(s). Specifically, the cells in the bottoming stack(s)/module(s) have a gradually increasing direct internal reforming catalyst loading from the anode inlet region to the anode outlet region. In contrast, the cells in the topping stack(s)/module(s) have DIR catalysts distributed uniformly from the anode inlet to the outlet region. Moreover, the bottoming stack(s)/module(s) have certain built-in design features to create a temperature gradient at the cathode inlet of each stack to improve the thermal uniformity in the cells. In particular, in each bottoming stack, the cathode inlet temperature gradient is 10-20 F and cathode inlet gas temperature is warmer near the anode inlet region and colder at the anode outlet region. In addition, the design features in the bottoming stack(s)/module(s) include using baffles at the cathode inlet face 3-5" from the cathode inlet face covering the entire cathode inlet face except a region near the anode outlet so as to direct cathode inlet gas toward the anode outlet region of the cathode inlet face. The cathode inlet gas entering the region near the anode outlet will be lower in temperature. This gas will pick up heat from the fuel cells before entering other regions of the cathode inlet face. Additional design features such as external levers or similar devices to adjust baffle orientation may be provided to make the temperature gradient at the cathode inlet of the bottoming stack(s)/module(s) adjustable.

The bottoming stack(s)/module(s) of the present invention may also include certain built-in design features to create a temperature gradient at the anode inlet of the stacks to improve the thermal uniformity in the fuel cells. Specifically, in each bottoming stack, the anode inlet temperature gradient is 10-20 F and anode inlet temperature is warmer near the cathode inlet regions and cooler at the cathode outlet region of the stack. In addition, the design features in the bottoming stack(s)/module(s) include the use of baffles at the anode inlet face 1-3" from the anode inlet face covering the entire anode inlet face except the region near the cathode outlet so as to direct anode inlet gas toward the cathode outlet region of the anode inlet face. The anode inlet gas entering the region near the cathode outlet will be lower in temperature. This gas will pick up heat from the fuel cells before entering other regions of the anode inlet face.

The topping stack(s)/module(s) of the present invention also include built in design features to create a temperature gradient at the cathode inlet of each topping stack so as to improve thermal uniformity in the cells. Specifically, the cathode inlet gradient in each topping stack is 10-20 F and cathode inlet gas temperature is warmer near the anode outlet region and cooler at the anode inlet region. The design features in the topping stack(s)/module(s) may include baffles at the cathode inlet face 3-5" from the cathode inlet face covering the entire cathode inlet face except the region near the anode inlet so as to direct the cathode inlet gas towards the anode inlet region of the cathode inlet face. The cathode inlet gas entering the region near the anode inlet will be lower in temperature. This gas will pick up heat from the fuel cells before entering other regions of the cathode inlet face. Additional design features such as external levers or similar devices to adjust baffle orientation may be provided to make the temperature gradient at the cathode inlet of the bottoming stack/module(s) adjustable.

The present invention also provides for controlling the temperature of the cathode inlet gas in the topping stack(s)/module(s) by cooling the cathode exhaust gas of the bottoming stack(s)/module(s) in a heat exchanger that also receives fresh air being conveyed to the bottoming stack cathode inlet. In certain embodiments, a portion of the exhaust from the anode exhaust oxidizer, which oxidizes the anode exhaust output from the bottoming stack(s)/module(s), bypasses the cathode side of the bottoming module and is directly conveyed to the cathode exhaust of the bottoming module(s). This is done to control the concentration of carbon dioxide of the cathode inlet of the bottoming stack(s)/module(s), so that Ni dissolution in the cathodes of the bottoming stack(s)/module(s) is minimized. In certain embodiments, the temperature of the cathode exhaust output from the bottoming fuel cell stack(s)/module(s) is controlled by controlling the amount of air supplied to the heat exchanger, which cools the cathode exhaust output from the bottoming fuel cell stack(s)/module (s). The preheated air combined with the exhaust output from the anode exhaust oxidizer is supplied to the cathode side of the bottoming stack(s)/module(s).

Figure 2:
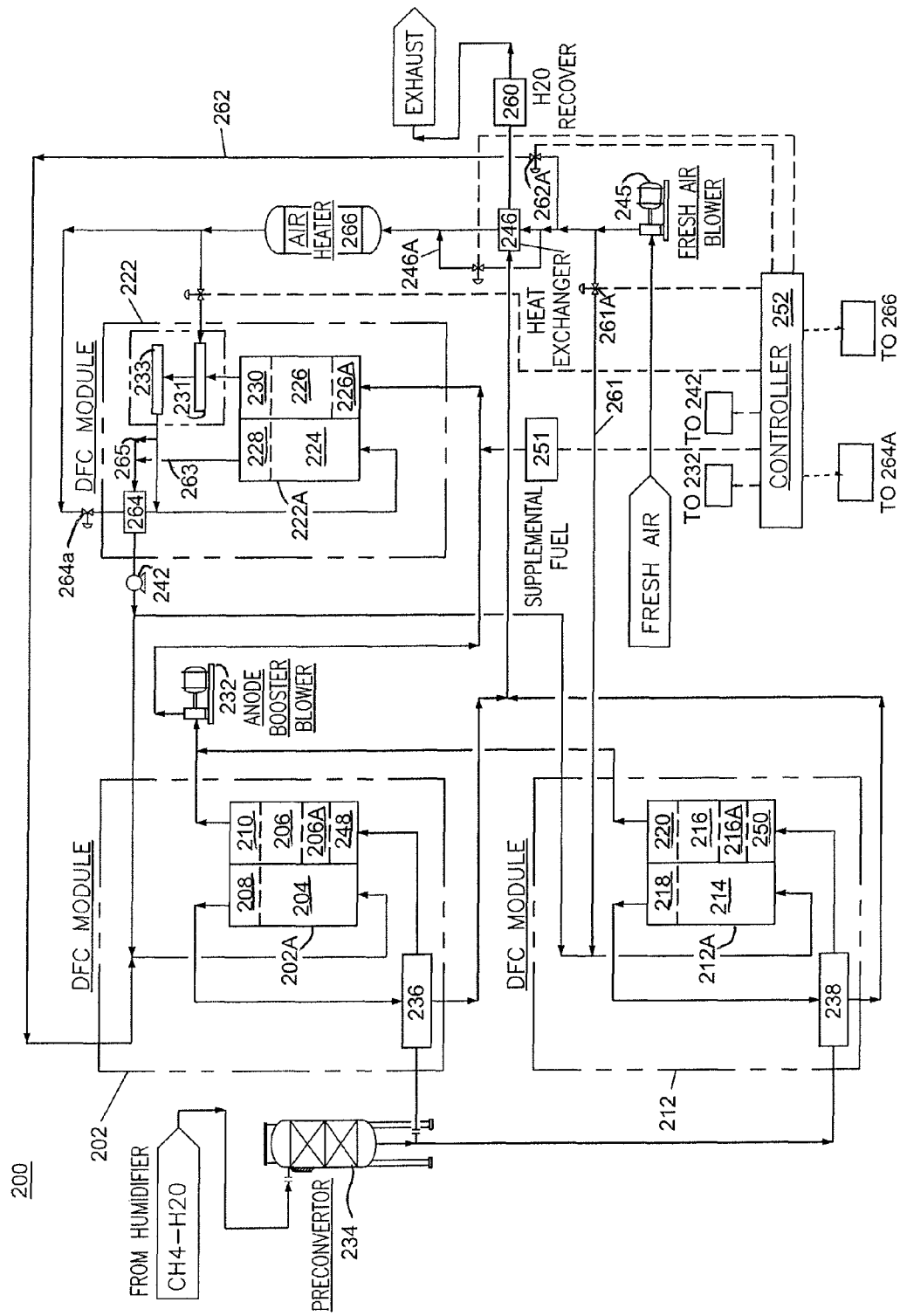
FIG. 2 shows a modular fuel cell system including a first topping fuel cell module, a second topping fuel cell module, and a bottoming fuel cell module.

FIG. 2 shows an illustrative embodiment of a modular fuel cell system 200 of the present invention. The fuel cell system 200 shown in FIG. 2 has improved performance efficiencies, and in particular, higher fuel utilization and power output compared to conventional fuel cell systems, and also provides manufacturing and operational cost efficiencies compared to conventional fuel cell systems described in the prior art. The improved performance and cost efficiencies of the fuel cell system 200 are described in more detail herein below.

The fuel cell system 200 of FIG. 2 includes a topping fuel cell assembly and a bottoming fuel cell assembly. In FIG. 2, the topping fuel cell assembly includes first and second topping fuel cell modules 202, 212 while the bottoming fuel cell assembly includes a bottoming fuel cell module 222. The first topping fuel cell module 202 comprises one or more first fuel cell stacks 202a, and each fuel cell stack having two or more cells and having a first topping cathode portion 204 and a first topping anode portion 206. Although in FIG. 2, the first topping fuel cell module 202 is shown as having one fuel cell stack, it is understood that in some embodiments, the first fuel cell topping module 202 includes two or more fuel cell stacks having similar configurations and being disposed within a common containment structure. The fuel cell stacks in the first topping fuel cell module 202 may include high temperature molten carbonate fuel cell stacks. In each cell of each stack 202a, the first topping cathode portion 204 and the first topping anode portion 206 are separated by molten carbonate electrolyte (not shown) stored in an electrolyte matrix.

In FIG. 2, the first topping fuel cell stack 202a is an internally reforming fuel cell stack and includes either direct internal reforming, indirect internal reforming or a combination of both direct and indirect internal reforming. In the present illustrative embodiment, the first topping fuel cell stack 202a includes one or more internal reforming units 248 receiving a portion of the fuel feed and outputting reformed or partially reformed fuel, including hydrogen and carbon monoxide, to a fuel turn manifold 206a, which directs the fuel to the first topping anode portion 206 of the cells of the stack where the fuel undergoes an electrochemical reaction with oxidant gas passing through the first topping cathode portion 204. In the illustrative embodiment of FIG. 2, the first topping cathode portion 204 receives oxidant gas provided to the common containment structure through an open stack face. However, in other embodiments, the oxidant gas may be supplied to the first topping cathode portion 204 through a cathode inlet manifold (not shown in FIG. 2).

As shown in FIG. 2, the first topping cathode portion 204 outputs cathode exhaust to a cathode outlet manifold 208. Cathode exhaust is then output from the cathode outlet manifold 208 via suitable ducting to a heat exchanger 236 which can be provided either inside or outside the first topping fuel cell module 202. The first topping anode portion 206 outputs anode exhaust to an anode outlet manifold. Anode exhaust is then conveyed from the anode outlet manifold 210 to outside of the first topping fuel cell module 202 for use in a bottoming fuel cell module 222.

As mentioned above, the first topping stack 202a includes one or more internal reforming units 248. Hydrogen, carbon dioxide and carbon monoxide are produced from fuel passing through the one or more internal reforming units 248. Reformed or partially reformed fuel is then supplied to the first topping anode portion 206 of the stack via fuel turn manifold 206a. In the first topping anode portion 206 of the stack, Hydrogen electrochemically reacts to produce water, Carbon monoxide either reacts electrochemically to form Carbon dioxide or chemically with water to produce Hydrogen and Carbon dioxide. Direct internal reforming (DIR) may also be provided in each cell of the first topping stack 202a by placing reforming catalyst in an anode compartment(s) of the first topping anode portion 206, and in particular, by placing the reforming catalyst in corrugations of an anode current collector of the anode compartment(s) of each cell in the stack.

As discussed above, the first topping fuel cell module 202 may include multiple first topping fuel cell stacks. The number of fuel cell stacks in each fuel cell module is determined based on the number needed to provide the desired power output. The number of fuel cells in each fuel cell stack may be determined by the required output, size and weight of the stacks and ease of transportation.

The topping fuel cell assembly of the fuel cell system 200 also includes the second topping fuel cell module 212, which includes one or more second fuel cell stacks 212. As with the first topping fuel cell module 202, FIG. 2 shows a single fuel cell stack 212a being included in the second topping fuel cell module 212, but it is contemplated that two or more second topping fuel cell stacks 212a may be included in the second fuel cell module 212 and housed in the same containment structure. The second topping fuel cell stacks in the second topping fuel cell module 212 may comprise high temperature molten carbonate fuel cells.

As shown in FIG. 2, the second topping fuel cell stack 212a includes a second topping cathode portion 214 and a second topping anode portion 216 which in each cell of a stack is separated by an electrolyte matrix storing therein molten carbonate electrolyte (not shown). Fuel entering the second topping anode portion 216 is reformed internally to produce partially or fully reformed fuel including hydrogen and carbon monoxide, which then undergoes an electrochemical reaction with oxidant gas passing through the second topping cathode portion 214. In the second topping anode portion 216 of the stack, Hydrogen electrochemically reacts to produce water, and Carbon monoxide either reacts electrochemically to form Carbon dioxide or chemically with water to produce Hydrogen and Carbon dioxide. The second topping fuel cell stack 212a includes indirect internal reforming, direct internal reforming or a combination of both direct and indirect internal reforming. In the present illustrative embodiment, the second topping fuel cell stack 212a includes one or more reforming units 250 receiving a portion of the fuel feed and outputting reformed or partially reformed fuel, including hydrogen and carbon monoxide, to a fuel turn manifold 216a, which directs the fuel to the second topping anode portion 216 of the stack where the fuel undergoes the electrochemical reaction with the oxidant gas. In FIG. 2, the second topping cathode portion 214 receives oxidant gas provided to the common containment structure through an open cathode inlet stack face. However, in other embodiments, the oxidant gas may be supplied to the second topping cathode portion 214 through a cathode inlet manifold (not shown in FIG. 2).

As shown in FIG. 2, the second topping cathode portion 214 outputs cathode exhaust to a cathode outlet manifold 218. Cathode exhaust is then output from the cathode outlet manifold 218 via suitable ducting to a heat exchanger 238 which can be provided either inside or outside the second topping fuel cell module 212. The second topping anode portion 216 outputs anode exhaust to an anode outlet manifold 220. Anode exhaust is then conveyed from the anode outlet manifold 220 to outside of the second topping fuel cell module 212 for use in the bottoming fuel cell module 222.

As mentioned above, the second topping fuel cell stack 212a includes one or more internal reforming units 250. Hydrogen, carbon dioxide and carbon monoxide are produced from fuel passing through the one or more internal reforming units 250. Reformed or partially reformed fuel is then supplied to the second topping anode portion 216 of the stack via the turn manifold 216a. Direct internal reforming (DIR) may also be provided in the second topping stack 212a by placing reforming catalyst in the anode compartment(s) of the second topping anode portion 216, and in particular, by placing the reforming catalyst in corrugations of an anode current collector of the anode compartment(s) in each cell of the second topping stack 212a.

Similarly as described above with respect to the first topping fuel cell module 202, the second topping fuel cell module 212 may include multiple second topping fuel cell stacks having similar construction. The number of fuel cell stacks per module is determined based on the number needed to provide the desired power output. The number of fuel cells in each fuel cell stack may be determined by the required output, size and weight of the stacks and ease of transportation.

As shown in FIG. 2, the fuel cell system 200 includes the bottoming fuel cell assembly which in FIG. 2 comprises the bottoming fuel cell module 222, including one or more fuel cell stacks 222a housed by a common containment structure. Each bottoming fuel cell stack 222a includes a bottoming cathode portion 224 and a bottoming anode portion 226 which in each cell of a stack is separated by an electrolyte matrix storing therein molten carbonate electrolyte (not shown).

The bottoming fuel cell stack 222a is an internally reforming fuel cell stack and includes direct internal reforming, indirect internal reforming or a combination of both direct and indirect internal reforming. In the embodiment of FIG. 2, the bottoming fuel cell stack 222a includes direct internal reforming catalyst placed in the anode compartment(s) of the bottoming anode portion 226, and in particular, in corrugations of an anode current collector of the anode compartment(s) in each cell of the second topping stack 222a. Although in the embodiment shown in FIG. 2, the bottoming fuel cell stack 222a does not include indirect internal reforming, in other embodiments, the bottoming fuel cell stack may include one or more reforming units for further reforming the anode exhaust received from the first and second topping modules before the reformed anode exhaust is conveyed to the bottoming anode portion 226.

In FIG. 2, the bottoming cathode portion 224 receives oxidant gas provided to the common containment structure through an open cathode inlet stack face. However, in other embodiments, oxidant gas may be supplied to the bottoming cathode portion 224 through a cathode inlet manifold. The oxidant gas in FIG. 2 includes fresh air which is preheated and supplied to the bottoming cathode portion. A first portion of the preheated fresh air may be combusted with anode exhaust output from the bottoming anode portion in an anode oxidizer assembly 231, 233 to produce heated oxidant gas which is then conveyed to the bottoming cathode portion together with a second portion of the pre-heated fresh air.

The bottoming cathode portion 224 outputs cathode exhaust rich in CO2 into a cathode outlet manifold 228. As shown in FIG. 2, cathode exhaust collected in the cathode outlet manifold 228 is then output from the bottoming fuel cell module 222 to the first and second topping cathode portions 204 and 214 via appropriate ducting 263. In the embodiment of FIG. 2, the cathode exhaust output from the bottoming fuel cell module 222 is split about evenly between the first and second topping cathode portions. However, in other embodiments, the relative amounts of the cathode exhaust provided to the first and second topping cathode portions may be controlled based on desired system operation. Cathode exhaust ducting 263 in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

In one embodiment, a portion of the heated oxidant gas supplied by the oxidizer assembly 231, 233 before it is mixed with a second portion of preheated fresh air, is diverted to the cathode exhaust ducting 263 in the bottoming module. This is done to control the concentration of CO2 in the heated oxidant gas that is supplied to the bottoming cathode portion 224. If the cathode inlet to the bottoming fuel cell module becomes too rich in CO2, the CO2 concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

In the present invention, the concentration of $CO_2$ and temperature of the inlet oxidant gas conveyed to the first and second topping fuel cell modules 202, 212 and the bottoming module 222 may be adjusted and modulated. Control of these adjustments may be performed by a programmable controller 252 or similar device. For example, the cathode exhaust of the bottoming fuel cell module 222 may be diluted with fresh air in order to control the temperature and concentration of CO2 in the inlet oxidant gas conveyed to the first and second topping fuel cell modules. If the cathode exhaust from the bottoming fuel cell module becomes too rich in CO2, the CO2 concentration in the cathode inlet gas supplied to the first and second topping fuel cell modules may be modulated to minimize Ni dissolution by diluting the bottoming fuel cell module's cathode exhaust with fresh air and/or controlling the amount of fresh air supplied to the oxidizer assembly 231, 233 and the amount of oxidant gas produced by the oxidizer 233 supplied to the bottoming fuel cell module.

In another embodiment, a cathode booster blower 242, is placed in the cathode exhaust ducting 263 that conveys cathode exhaust from the bottoming module 222 to raise the pressure of the first and second topping cathode portions 204 and 214 in order to maintain required differential pressure between the anode and cathode portions in the first and second topping modules 202 and 212, respectively.

Similarly as described above with respect to the first topping fuel cell module 202, the bottoming fuel cell module 222 may include multiple bottoming fuel cell stacks, each having a cathode portion and an anode portion. The number of fuel cell stacks per module is determined based on the number needed to provide the desired power output and the efficiency. The fuel cell stacks 222a in the bottoming fuel cell module 222 may include high temperature molten carbonate fuel cells.

As shown in FIG. 2, the bottoming anode portion 226 of the bottoming fuel cell module 222 is operably coupled to each of the first topping anode portion 206 and the second topping anode portion 216 such that the bottoming anode portion 226 receives anode exhaust output from both the first and the second topping anode portions 206 and 216. The first topping anode portion 206 and the second topping anode portion 216 are therefore configured in a two-to-one ratio with the bottoming anode portion 226. Furthermore, the total number of fuel cell stacks of the first and second topping fuel cell modules 202 and 212 are configured in a two-to-one ratio with the number of fuel cell stacks of the bottoming fuel cell module 222. In other embodiments, the number of topping modules and bottoming modules will vary, and the total number of topping fuel cell stacks and bottoming fuel cell stacks may also vary. For increased efficiency, in certain embodiments, the number of topping modules is greater than the number of bottoming modules, and/or the total number of topping fuel cell stacks is greater than the total number of bottoming fuel cell stacks. The topping modules or stacks have higher current density (because of better fuel quality) and fuel utilization than the bottoming modules or stacks.

As mentioned above, the number of fuel cells in each stack, and thus, the height of each stack, in case is controlled by transportability constraints. Standard topping fuel cell stacks in the topping module(s) include about 400 fuel cells, including indirect internal reforming units. However, the bottoming fuel cell stacks in the bottoming module(s) have no reforming units or a significantly smaller number of reforming units than the topping fuel cell stacks. As a result, more space is available to include additional fuel cells in the bottoming fuel cell stacks. For example, if no reforming units are used in the bottoming fuel cell stacks, then there is room for adding on 32 fuel cells to the stack. Thus, in some embodiments, the topping module(s) may include a greater total number of fuel cell stacks than the bottoming module(s), but the number of fuel cells included in each bottoming fuel cell stack may be greater than the number of fuel cells included in each topping fuel cell stack. This stack design helps to maximize power output of the system.

Although in the specific configuration of FIG. 2, the number of topping fuel cell modules and the total number of topping fuel cell stacks is greater than the number of bottoming fuel cell module(s) and/or the total number of bottoming fuel cell stack(s), it is understood that in other configurations, the number of topping fuel cell module(s) may be the same as the number of bottoming fuel cell module(s), and/or the total number of topping fuel cell stack(s) may be the same as the total number of bottoming fuel cell stack(s). In such other configurations, the topping fuel cell module(s) and the topping fuel cell stack(s) will have a greater total number of fuel cells than the bottoming fuel cell module(s) and the bottoming fuel cell stack(s). For example, it is possible to configure the system so that the system includes one topping module with one topping fuel cell stack and one bottoming module with one bottoming fuel cell stack, and the total number of fuel cells in the topping fuel cell stack is greater than the total number of fuel cells in the bottoming fuel cell stack.

Operation of the system shown in FIG. 2 will now be described. During operation, the first and second topping fuel cell modules 202, 212 each receive a portion of the fuel feed, such as methane, natural gas, or other suitable fuel, from a fuel supply. Prior to being conveyed to the topping fuel cell modules 202, 212, the fuel feed may be preheated and/or processed. For example, a humidifier may be used to humidify the fuel feed and a preconverter 234 may be used to partially reform some of the fuel feed externally of the topping fuel cell modules. Moreover, the fuel feed may be deoxidized in a deoxidizer, desulfurized in a desulfurizer (not shown) and/or undergo other processing as may be required to meet fuel cell specifications for purity. Preheated and/or processed fuel feed is then divided between the first and second topping fuel cell modules 202, 212, with the first topping fuel cell module 202 receiving a first portion of the fuel feed and the second topping fuel cell module 212 receiving a second portion of the fuel feed, and the first and second portions of the fuel feed may be controlled to be about the same or to be different in amount. The controller 252 may be used to control the respective amounts of the first and second fuel feeds supplied to the first and second topping fuel cell modules 202, 212. The fuel feed portions received in each of the first and second topping fuel cell modules 202, 212 are then pre-heated using cathode exhaust heat output from the respective topping fuel cell module in first and second heat exchangers 236, 238, respectively. In some embodiments the heat exchangers 236 and 238 can be combined into one heat exchanger. In each of the first and second fuel cell modules 202, 212, the pre-heated fuel feed portion is then conveyed to the topping anode portion 206, 216 of the one or more fuel cell stacks of the respective topping module and may be reformed in an indirect internal reformer 248, 250 before being conveyed to the respective topping anode portion 206, 216.

The first and second topping fuel cell modules 202, 212 consume a portion of the fuel contained in the respective fuel feed portions conveyed to the topping fuel cell module, so that the anode exhaust output the first and second topping modules 202, 212 contains the remaining fuel portion therein. In the embodiment of FIG. 2, the first and second fuel cell modules 202, 212 consume about two-thirds of the fuel in the fuel feed, and output anode exhaust containing the remaining portion of fuel, which is about one third of the initial fuel in the fuel feed. In FIG. 2, the fuel cell system 200 includes an anode booster blower 232 which is disposed downstream from the first and second topping fuel cell modules 202, 212 and upstream of the bottoming fuel cell module 222. The anode booster blower 232 receives anode exhaust output from the first and second topping anode portions 206, 216 and increases the pressure of the anode exhaust before it is conveyed to the bottoming fuel cell module 222. The anode booster blower 232 operates with a low pressure increase, resulting in low compression power and low cost. The anode booster blower 232 operation may be controlled by the controller 252 so as to control the differential pressure between the anode and cathode portions of the first and second topping fuel cell modules 202 and 212 respectively.

As shown in FIG. 2, anode exhaust supplied to the bottoming fuel cell module 222 by the anode booster blower 232 may be supplemented with fresh fuel 251. The supplemental fresh fuel may be mixed with the anode exhaust without requiring any additional water to humidify the fuel since the anode exhaust stream from the first and second topping fuel cell modules 202, 212 includes adequate amounts of water. The amount of fresh fuel supplied to the bottoming fuel cell module may be controlled by the controller 252 so as to achieve a desired fuel utilization and current generation in the bottoming fuel cell module. The supplemental fresh fuel may be supplied from the same fuel supply as the topping fuel cell modules, or may be supplied from a different fuel supply. In some embodiments, the supplemental fresh fuel comprises a reformable fuel such as methane.

As mentioned herein above, in some embodiments, the bottoming fuel cell stacks of the bottoming fuel cell module include indirect internal reformers. In such embodiments, the supplemental fuel is provided to the indirect internal reformers of the bottoming fuel cell stack, and the reformed or partially reformed supplemental fuel is then fed from the indirect internal reformers to the bottoming anode portions of the bottoming stack. In some embodiments, only the supplemental fuel is fed to the indirect internal reformers of the bottoming fuel cell stack, while the anode exhaust from the first and second topping fuel cell modules 202, 212 is provided directly into the fuel turn manifold of the bottoming stack, without being conveyed through the indirect internal reformers. This configurations improves the thermal profile of the bottoming stacks and maximizes the power output from the bottoming stacks.

Anode inlet gas comprising anode exhaust from the topping fuel cell modules and optionally supplemental fresh fuel is received in the bottoming fuel cell module 222 and is conveyed to the bottoming anode portion 226 of the fuel cell stack(s) in the bottoming fuel cell module. As discussed above, the anode inlet gas may be reformed through direct internal reforming in the bottoming anode portion, and anode exhaust produced by the bottoming anode portion is output from the bottoming fuel cell stack(s) via the anode outlet manifold 230. Anode exhaust output from the bottoming fuel cell module 222 is conveyed to the anode oxidizer assembly that includes a mixer/eductor 231 and the oxidizer 233. The mixer/eductor 231 also receives a first portion of pre-heated air input into the system and mixes the anode exhaust with the pre-heated air, and the oxidizer 233 oxidizes the anode exhaust with the pre-heated air to output a high temperature oxidant gas suitable for use in a fuel cell cathode. As shown in FIG. 2, the high temperature oxidant gas output from the oxidizer 233 is combined with a second portion of the pre-heated air to form cathode inlet gas which is then input into the bottoming cathode portion 224 of the bottoming module 222. The amount of the first portion of pre-heated air provided to the mixer/eductor 231 is controlled by the controller 252. The amount of pre-heated air provided to the mixer/eductor 231 is controlled so as to control the temperature of the inlet oxidant gas to the bottoming cathode portion 224 and to control the temperature of the cathode exhaust output from the bottoming cathode portion 224.

In one embodiment, a portion of the heated oxidant gas supplied by the oxidizer assembly 231, 233 before it is mixed with a second portion of preheated fresh air, is diverted to the cathode exhaust ducting 263 in the bottoming module via ducting 265. This is done to control the concentration of $CO_2$ in the heated oxidant gas that is supplied to the bottoming cathode portion 224. If the cathode inlet to the bottoming fuel cell module becomes too rich in $CO_2$, the $CO_2$ concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

Cathode exhaust ducting 263, in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

As can be seen in FIG. 2, fresh air is supplied to the system 200 using a blower 245. A first portion of the air, which may include all or a portion of the air supplied by the blower 245, is conveyed to a heat exchanger 246 for heating. The cathode exhaust 208 and 218 from the first and second topping modules 202 and 212 respectively is used to heat the first portion of air in the heat exchanger 246. In some embodiments, some or all of the first air portion may be bypassed around the heat exchanger 246 via a bypass line 246a, and the amount of air bypassed around the heat exchanger 246 may be controlled by the controller 252 and will depend on the desired temperature of the inlet oxidant gas input into the bottoming cathode portion 224 and the desired temperature of the cathode inlet of the topping cathode portions 202 and 212. An air heater 266, is positioned downstream of the heat exchanger 246 to heat the first portion of air in certain modes of operation, such as when the system is heating up or not producing power or at low output. The air heater 266 may be a natural gas fired heater or an electric heater. The output of the air heater 266 is controlled by the controller 252 depending on the desired temperature of the inlet oxidant gas input into the bottoming cathode portion 224 and the desired temperature of the cathode inlet of the topping cathode portions 202 and 212. In this way, the controller 252 is able to control the temperature of the inlet oxidant gas conveyed to the bottoming cathode portion 224 and the temperature of the cathode inlet oxidant gas conveyed to the topping cathode portions 204 and 214, and thus, the temperature in the fuel cell stacks 202a, 212a, and 222a of the topping modules 202, 212, and bottoming module 222, respectively.

As shown in FIG. 2, a first portion of the pre-heated air output from the air heater 266 is conveyed to the anode oxidizing assembly 231, 233 for oxidizing the anode exhaust, as discussed above, and the second portion of pre-heated fresh air is conveyed to the bottoming cathode portion 224. As shown and discussed above, the remaining pre-heated air is combined with the oxidant gas output from the oxidizer 233 before being input into the bottoming cathode portion 224. Before oxidant gas output from the oxidizer 233 mixes with the second portion of the preheated fresh air, a portion of the oxidant gas output from the oxidizer 233 is conveyed to the cathode exhaust duct 263 from the bottoming modules via the bypass duct 265. This is done to reduce the concentration of $CO_2$ in the oxidant inlet gas input into the bottoming cathode portion 224. The diversion of the oxidant gas from the oxidizer 233 to the topping modules is controlled by the controller 252 or similar device.

Before oxidant gas output from the oxidizer 233 mixes with the second portion of the preheated fresh air, the cathode exhaust portion from the bottoming module is cooled in a heat exchanger 264, using the second portion of preheated fresh air. This is done to control the cathode inlet temperature of the cathode inlet portion 204 and 214 of the first and second topping modules, respectively.

In such embodiments, all or a portion of the cathode exhaust output from the bottoming module 222 would be conveyed through the heat exchanger 264 and some of the heat in the cathode exhaust would be used to pre-heat the second portion of preheated fresh air being conveyed along with the output of the anode exhaust oxidizer 233 to the inlet of cathode portion 224 of the bottoming module 222. The amount of air supplied to the heat exchanger 264 is adjustable by the controller 252 so as to control the cathode inlet temperature of the first and second topping modules. The amount of cathode exhaust conveyed to the heat exchanger 264 may also be controlled by the controller 252 or similar device by controlling a valve 264a so as to control the cathode inlet temperature of the oxidant gas entering the topping modules. The heat exchanger may be located in the bottoming module 222.

Cathode exhaust output from the bottoming cathode portion 224 is then conveyed to the first and second topping modules 202, 212 for use as oxidant gas in the first and second topping cathode portions 204, 214. The system 200 may also include a cathode exhaust booster 242 provided on the cathode side downstream from the bottoming module 222 and upstream from the topping modules 202, 212 for increasing the pressure of the cathode exhaust output from the bottoming module 222 before being conveyed to the topping modules. In this way, the pressure differential between the anode side and the cathode side in the topping modules may be adjusted and controlled so as to maintain a low differential pressure between the cathode and the anode sides. The controller 252 or similar control device may be used for controlling the operation of the cathode exhaust booster so as to control the differential pressure between the anode and cathode sides.

The cathode exhaust output from the bottoming cathode portion 224 may be divided about equally between the first and second topping cathode portions 204, 214. However, in some embodiments, the amount of cathode exhaust from the bottoming cathode portion 224 received by each of the first and second topping cathode portions 204, 214 may be varied and controlled based on the desired operation and fuel utilization in the topping first and second topping modules 202, 212.

As shown in FIG. 2, some of the air supplied by the blower 245 may be bypassed around the bottoming fuel cell module 222 and may be supplied as supplemental oxidant gas to the first and second topping fuel cell modules 202, 212. Specifically, a third portion of the air from the blower 245 is conveyed via a bypass duct 262 to the first topping fuel cell module 202 for use in the first topping cathode portion 204, and a fourth portion of the air form the blower 245 is conveyed via a bypass duct 261 to the second topping cathode portion 214. As shown, the third air portion is combined with a portion of the cathode exhaust from the bottoming cathode portion 224 prior to being input into the first topping cathode portion 204, while the fourth air portion is combined with the remaining portion of the cathode exhaust from the bottoming cathode portion 224 prior to being input into the second topping cathode portion 214. The amounts of third and fourth air portions conveyed to the first and second topping cathode portions, respectively, is controlled by the controller 252 via suitable valves 262a, 261a so as to control the cathode inlet temperature of the inlet oxidant gas entering the topping modules.

After undergoing an electrochemical reaction in the topping fuel cells, spent oxidant is output from the first and second topping cathode portions 204, 214 as cathode exhaust. As discussed above, waste heat from cathode exhaust output from the first topping cathode portion 204 is used for pre-heating a portion of the fuel feed in the heat exchanger 236, and waste heat from the cathode exhaust output from the second topping cathode portion 214 is used to pre-heat the other portion of the fuel feed in the heat exchanger 238. After being output from the first and second topping modules 202, 212, cathode exhaust streams may be combined and conveyed to the fuel humidifier (not shown), which also receives fuel feed and water and where waste heat from the cathode exhaust is used to form steam and to humidify the fuel feed with the steam. The cathode exhaust may also be conveyed to the heat exchanger 246 so that waste heat remaining in the cathode exhaust is used for pre-heating incoming air.

In the embodiment shown in FIG. 2, the system 200 includes a water recovery assembly 260 for recovering water from the cathode exhaust. After the waste heat in the cathode exhaust is recovered in the heat exchangers 236, 238, the fuel humidifier (not shown in FIG. 2) and/or the heat exchanger 246, cooled cathode exhaust may be conveyed to the water recovery assembly 260, which recovers water from the cathode exhaust. Detailed construction of the water recovery assembly 260, which recovers water from the fuel cell system 200 exhaust is not shown in FIG. 2. Water recovered in the water recovery assembly 260 may be re-used in the fuel cell system 200 for humidifying the fuel feed. As shown in FIG. 2, water separated cathode exhaust is then output from the system 200 by venting or the like. Although not shown in FIG. 2, the same or separate water recovery assembly may be used to also recover water in a portion of the anode exhaust output from the bottoming anode portion 226. U.S. Pat. No. 8,367,256, assigned to the same assignee herein and incorporated herein by reference, discloses an exemplary water recovery assembly that may be used as the water recovery assembly 260.

As discussed above, the fuel cell system 200 includes the controller 252 programmed to control various components and operations of the fuel cell system 200. The controller 252 is programmed to control one or more of:

(1) the amount of supplemental air (fresh air) supplied to the first and second topping fuel cell modules 202, 212 so as to dilute the cathode exhaust of the bottoming fuel cell module 222 with the fresh air and to control the temperature and concentration of $CO_2$ in the inlet oxidant gas conveyed to the first and second topping modules;

(2) the amount of oxidant gas output from the oxidizer 233 diverted to the topping modules 202, 212 so as to control the $CO_2$ concentration in the oxidant gas conveyed to the bottoming module;

(3) the operation of the anode booster blower 232 so as to control the differential pressure between the anode and cathode portions of the first and second topping fuel cell modules 202 and 212 and to maintain a low differential pressure;

(4) the operation of the cathode exhaust booster so as to control the differential pressure between the anode and cathode portions of the topping fuel cell modules and to maintain a low differential pressure;

(5) the amount of supplemental fuel supplied to the bottoming fuel cell module so as to achieve a desired fuel utilization and current generation in the bottoming fuel cell module;

(6) the amount of air bypassed around the heat exchanger 246 so as to control the temperature of the inlet oxidant gas to the bottoming fuel cell module 222;

(7) the amount of the pre-heated air portion conveyed to the mixer/eductor 231 for oxidation of anode exhaust;

(8) the amount of cathode exhaust output from the bottoming fuel cell module provided to each of the first and second topping fuel cell modules;

(9) the amount of heated air and/or cathode exhaust from the bottoming fuel cell module supplied to the heat exchanger 264 to control the cathode inlet temperature of the first and second topping modules;

(10) the output of the air heater 266 to control the temperature of the inlet oxidant gas input into the bottoming fuel cell module and the temperature of the cathode inlet to the topping fuel cell modules;

(11) the amount of fuel feed provided to each of the first and second topping fuel cell modules;

(12) gradually withdraw supplemental fuel from bottom stacks and deliver the fuel to the topping stacks and shifting of output from the topping modules to the bottoming module as the stacks age.

Controlling of one or more of the above operations by the controller depends on the actual operating conditions and desired operation of the system, the length of operation, and other factors. For example, current generated by the bottoming fuel module 222 is controlled based on electricity needs, e.g., customer need for electricity, so that when electricity need is low, the controller 252 controls so that a smaller amount of or no supplemental fuel is supplied to the bottoming fuel cell module, and when electricity needs increase, the controller 252 controls so that the amount of supplemental fuel supplied to the bottoming fuel cell module is increased. In certain embodiments, the controller 252 may direct the plant exhaust of the high efficiency fuel cell system to a heat exchanger (Not shown in FIG. 2) to provide heat for heating the high pressure natural gas from a gas distribution system in an Energy Recovery Generation System before pressure is let down through a turbine. Use of heat from a fuel cell power plant to heat the high pressure natural gas from a gas distribution system is discussed in U.S. Pat. No. 8,080,344, assigned to the same assignee herein and incorporated herein by reference. In the illustrative system shown in FIG. 2, the cathode exhaust output from the topping modules is conveyed to heat exchanger (not shown) to provide the heat for heating the high pressure natural gas from the gas distribution system. The heat exchanger for providing the heat to the high pressure natural gas may be provided upstream or downstream of the heat exchanger 246 used for heating input air.

Moreover, in the present invention, as the reforming rates of the first topping fuel cell module 202 and the second topping fuel cell module 212 decrease with age of the system, the controller 252 controls so that supplemental fuel, which is methane rich fuel, conveyed to the bottoming module 222 is gradually diverted to the first and second topping modules 202, 212. That is, as the system continues to operate and the reforming rates in the topping modules 202, 212 decrease, less supplemental fuel is sent to the bottoming module 222 and more fuel is sent to the first and second topping modules 202, 212. In this way, the loss of methane cooling load of the topping modules is compensated by the addition of more fuel including methane. As a result, current generated in the topping modules is reduced with operating time and current generated in the bottoming module(s) is increased with operating time based on the amount of unreformed fuel supplied to the bottoming module(s) from the topping module(s). Moreover, such control does not affect the cooling of the bottoming module 222 since the bottoming module receives unconverted fuel, including unconverted methane, from the topping modules that have reduced reforming rates.

According to the system and operation of the system described above, fuel is first fed to two parallel topping fuel cell modules 202 and 212, which electrochemically consume about 65% to 75% of the fuel depending on operating conditions. Fuel exhaust from the topping fuel cell modules 202 and 212 is then supplied to the bottoming fuel cell module 222, which may also receive additional fresh fuel (supplemental fuel). The bottoming fuel cell module 222 consumes about 60-70% of the fuel it receives in an electrochemical conversion reaction. Thus, the fuel cell system 200 achieves an overall fuel conversion to electricity approaching 90% and achieves electrical conversion efficiency higher than 60%.

A simulation was performed to measure net power output, overall fuel utilization, electrical efficiency, fuel use, and cost per kilowatt of power produced of various conventional systems in comparison with the system 200 of the present invention. The results of the simulation are summarized in Tables 2 and 3. Table 2 provides a comparison of the following fuel cell systems: (1) baseline simple cycle system with two MW-class stack modules; (2) a fuel cell-turbine system with two MW-class stack modules (similar to the system described in U.S. Pat. No. 6,365,290); (3) a system having two MW-class modules in series (similar to the system described in U.S. Pat. Nos. 8,062,799 and 8,236,458); and (4) the fuel cell system of the present invention (HEFC) using three MW-class modules as shown in FIG. 2.

TABLE 2

| | Fuel Cell System | | | |
|---|---|---|---|---|
| | (1) | (2) | (3) | (4) |
| Net AC Output (kW) | 2.8 | 3.4 | 2.4 | 3.7 |
| Overall Fuel Utilization | 69% | 85%* | 81% | 87% |
| Electrical Efficiency (LHV) | 47% | 57.60% | 55% | 60% |
| Fuel Use LHV (MMBTU/MWh) | 8.03 | 6.55 | 6.86 | 6.29 |
| Capital Cost ($000s/kW) | 4942 | 5876 | 5765 | 4684 |

*Equivalent fuel utilization with 600 kW turbine output.

As indicated by the results in Table 2, the fuel cell system 200 has the highest net output, fuel utilization, and electrical efficiency as well as the lowest fuel use and cost per kilowatt of power produced. Since the system 200 of the present invention can be configured using currently available MW-class modules, the present invention can achieve the highest system efficiency with the lowest per kW cost.

As discussed above, in the present invention, the bottoming fuel cell module 222 has a lower current density than each of the first topping fuel cell module 202 and the second topping fuel cell module 212. Table 3 provides results of the simulation test of the system 200 and shows a comparison of the power output (kW), current density (C.D. mA/cm$^2$) and fuel utilization (Uf) for the first and second topping fuel cell modules 202 and 212 and the bottoming fuel cell module 222.

TABLE 3

| Module output breakdown | Output (kW) | Current Density (mA/cm$^2$) | Uf |
|---|---|---|---|
| Topping Modules (per module) | 1410 | 156.2 | 69% |
| Bottoming Module | 880 | 92 | 66% |

As can be seen from Table 2, the power output, current density and fuel utilization of the bottoming fuel cell module 222 is lower than the power output, current density and fuel utilization of each of the topping fuel cell modules 202 and 212 because of fuel dilution and reduced reforming-cooling.

The controller 252 can be a conventional PLC (programmable logic controller) made by GE. The control program used, in turn, can be a software product called "Versapro," a GE product implementable in GE PLCs for industrial automation. In other embodiments, the controller can be a conventional DCS (distributed control system) manufactured by Foxboro, and the control program can be software implemented in the DCS for industrial automation, also manufactured by Foxboro. In yet another embodiment, the controller can be a conventional PLC-based "Iconics" system.

The present invention also contemplates controlling thermal conditions in the fuel cell stacks of the topping and bottoming modules of the system shown in FIG. 2. As discussed above, the fuel cell stacks of the topping and bottoming modules include internal reforming and in particular, direct internal reforming wherein reforming catalyst is distributed within the anode compartments of the stacks. In order to improve thermal uniformity of the fuel cells, particularly in the stack(s) of the bottoming module, the fuel cells in the bottoming module use a different amount and spatial distribution of the direct internal reforming catalyst than the fuel cells in the topping modules. Specifically, in the fuel cells of the bottoming modules, the loading density of the direct internal reforming catalyst gradually increases from the anode inlet region of the fuel cells to the anode outlet region in order to provide thermal uniformity of the cells. In contrast, in the fuel cells of the topping modules, the loading density of the direct internal reforming catalyst is uniformly distributed in both fuel flow and air flow directions.

Figure 3:
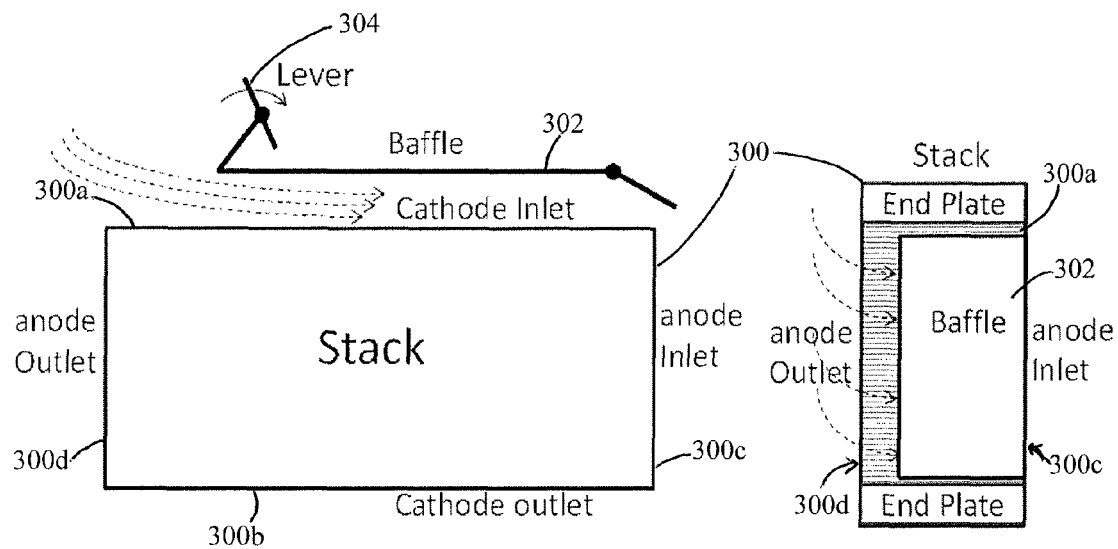
FIG. 3 shows an example of a bottoming fuel cell stack that includes a cathode inlet baffle.

The direct internal reforming catalyst loading in the fuel cells of the bottoming module and other design features in the bottoming module also create a temperature gradient at the cathode inlet of the stacks, which improves thermal uniformity of in the cells. Specifically, the cathode inlet temperature gradient is about 10-20 F with the cathode inlet gas temperature being warmer near the anode inlet region and cooler near the anode outlet region. This temperature gradient may be achieved by including one or more baffles at the cathode inlet face of the stack. FIG. 3 shows an illustrative configuration of a fuel cell stack 300 having a cathode inlet face 300a, a cathode outlet face 300b, an anode inlet face 300c and an anode outlet face 300d, and a baffle 302 provided about 3-5" from the cathode inlet face 300a. As shown in FIG. 3, the baffle 302 covers the entire cathode inlet face except a region near the anode outlet and is used for directing the oxidant inlet gas towards the anode outlet region of the cathode inlet face 300a. The additional oxidant gas flow near the anode outlet region results in lower temperatures in this region as compared to the temperatures near the anode inlet region of the cathode inlet face 300a. The cathode inlet gas entering the region near the anode outlet will be lower in temperature. This gas will pick up heat from the fuel cells before entering other regions of the cathode inlet face 300a. Moreover, the temperature gradient at the cathode inlet of the bottoming fuel cell stack can be modulated or adjusted by one or more external levers 304 to adjust baffle orientation. By moving the baffle 302 away from the cathode inlet face 300a, the temperature gradient can be made smaller. The adjustment of the temperature gradient at the cathode inlet of the bottoming fuel cell stack may be controlled by the controller 252 or similar device.

Figure 4:
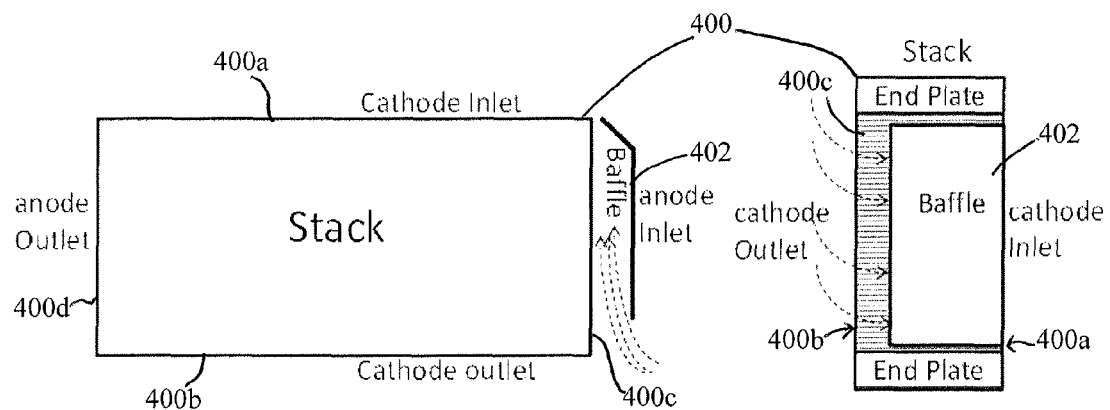
FIG. 4 shows an example of a bottoming fuel cell stack that includes an anode inlet baffle.

Moreover, in certain embodiments, the direct internal reforming catalyst loading in the fuel cells of the bottoming module and other design features in the bottoming module also create a temperature gradient at the anode inlet of the bottoming stacks, which further improves thermal uniformity of in the cells. Specifically, the anode inlet temperature gradient is about 10-20 F with the anode inlet gas temperature being warmer near the cathode inlet region and cooler near the cathode outlet region. This temperature gradient may be achieved by including one or more baffles at the anode inlet face of the stack. FIG. 4 shows an illustrative configuration of a fuel cell stack 400 having a cathode inlet face 400a, a cathode outlet face 400b, an anode inlet face 400c and an anode outlet face 400d, and a baffle 402 provided about 1-3" from the anode inlet face 400c. As shown in FIG. 4, the baffle 402 covers the entire anode inlet face except a region near the cathode outlet and is used for directing the anode inlet gas towards the cathode outlet region of the anode inlet face 400c. The gas entering the anode inlet towards the cathode outlet region will be cooler. This gas will pick up heat from the fuel cells before entering other regions of the anode inlet face 400c. Moreover, the temperature gradient at the anode inlet of the bottoming fuel cell stack can be modulated or adjusted by modulating the temperature of the input fuel gas to the bottoming module 222. In an illustrative example, a heat exchanger can be used to cool the anode exhaust gas from the first and second topping modules 202 and 212, respectively. By lowering the temperature of the input fuel gas, the temperature gradient may be increased.

Figure 5:
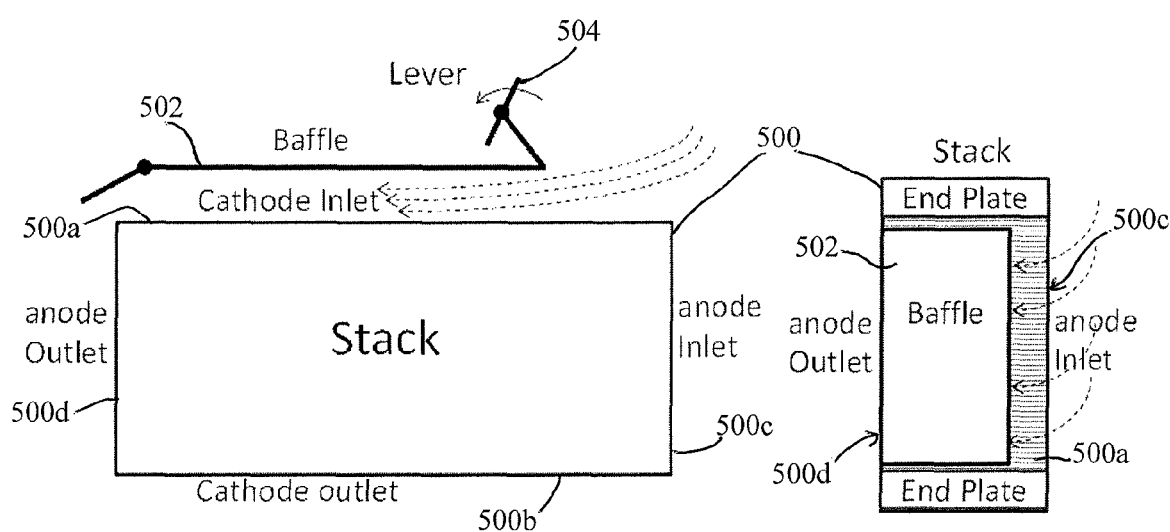
FIG. 5 shows an example of a topping fuel cell stack that includes a cathode inlet baffle.

In some embodiments, the first and second topping modules include built in design features that create a temperature gradient at the cathode inlet of the stacks to improve thermal uniformity of in the cells of the topping modules. Specifically, the cathode inlet temperature gradient is about 10-20 F with the cathode inlet gas temperature being warmer near the anode outlet region and cooler near the anode inlet region. This temperature gradient may be achieved by including one or more baffles at the cathode inlet face of the stack. FIG. 5 shows an illustrative configuration of a fuel cell stack 500 having a cathode inlet face 500a, a cathode outlet face 500b, an anode inlet face 500c and an anode outlet face 500d, and a baffle 502 provided about 3-5" from the cathode inlet face 500a. As shown in FIG. 5, the baffle 502 covers the entire cathode inlet face 500a except a region near the anode inlet and is used for directing the cathode inlet gas towards the anode inlet region of the cathode inlet face 500a. The cathode inlet gas entering the region near the anode inlet will be lower in temperature. This gas will pick up heat from the fuel cells before entering other regions of the cathode inlet face 500a. Moreover, the temperature gradient at the cathode inlet of the topping fuel cell stack can be modulated or adjusted by external levers 504 to adjust baffle orientation. By moving the baffle away from the cathode inlet face, the temperature gradient can be made smaller. The adjustment of the temperature gradient at the cathode inlet of the topping fuel cell stack may be controlled by the controller 252 or similar device.

The system shown in FIG. 2 is an illustrative example of the system of the present invention which uses one or more topping stack(s), which may be in the form of module(s) and one or more bottoming stack(s), which may be in the form of module(s), and wherein anode exhaust from the topping stack(s) is conveyed to the bottoming stack(s) and cathode exhaust from the bottoming stack(s) is conveyed to the topping stack(s), and wherein the topping stack(s) and bottoming stack(s) are configured to generate ~⅔ of the system currents in the topping stacks and ~⅓ of the system current in the bottoming stack(s), to improve fuel utilization, fuel efficiency, thermal uniformity within the system and lower cost of electricity.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

What is claimed is:

1. A high efficiency fuel cell system comprising:
a topping fuel cell assembly comprising a plurality of topping fuel cells, a topping cathode portion, and a topping anode portion, wherein, in each of the plurality of topping fuel cells, the topping cathode portion and the topping anode portion are separated by an electrolyte; and
a bottoming fuel cell assembly comprising one or more bottoming fuel cells, a bottoming cathode portion, and a bottoming anode portion, wherein in each of the one or more bottoming fuel cells, the bottoming cathode portion and the bottoming anode portion are separated by an electrolyte;

wherein the bottoming anode portion is configured to receive anode exhaust output from the topping anode portion, and the topping cathode portion is configured to receive cathode exhaust from the bottoming cathode portion; and wherein a number of the plurality of topping fuel cells in the topping fuel cell assembly is greater than a number of the one or more bottoming fuel cells in the bottoming fuel cell assembly, such that the topping fuel cell assembly utilizes more fuel than the bottoming fuel cell assembly.

2. The high efficiency fuel cell system in accordance with claim 1, wherein the topping fuel cell assembly comprises a plurality of topping fuel cell modules, each of said topping fuel cell modules including at least one fuel cell stack, and the bottoming fuel cell assembly comprises one or more bottoming fuel cell modules, each of the one or more bottoming fuel cell modules including at least one fuel cell stack, and wherein the number of the topping fuel cell modules is greater than the number of the one or more bottoming fuel cell modules.

3. The high efficiency fuel cell system in accordance with claim 2, wherein each of said topping and bottoming fuel cell modules includes a plurality of fuel cell stacks housed within a common containment structure.

4. The high efficiency fuel cell system in accordance with claim 2, wherein, during operation, the topping fuel cell modules utilize about ⅔ of fuel content supplied to the high efficiency fuel cell system and the one or more bottoming fuel cell modules receive anode exhaust output from the topping fuel cell modules comprising about ⅓ of the fuel content supplied to the high efficiency fuel cell system.

5. The high efficiency fuel cell system in accordance with claim 2, wherein the one or more bottoming fuel cell module operate at a lower current density than the topping fuel cell modules.

6. The high efficiency fuel cell system in accordance with claim 1, wherein the bottoming anode portion further receives supplemental fuel, and the high efficiency fuel cell system further comprises a controller configured to control an amount of supplemental fuel conveyed to the bottoming anode portion, wherein the controller is configured to control an amount of current generated in the bottoming fuel cell assembly by controlling the amount of supplemental fuel conveyed to the bottoming anode portion.

7. The high efficiency fuel cell system in accordance with claim 6, wherein one or more of:
(a) the controller is configured to control the amount of current generated in the topping and bottoming fuel cell assemblies such that as operating time of the high efficiency fuel cell system increases, an amount of current generated in the topping fuel cell assemblies decreases and the amount of current generated in the bottoming fuel cell assemblies increases; and
(b) the controller is configured to control the amount of current generated in the bottoming fuel cell assembly based on electricity need such that the amount of current generated in the bottoming fuel cell assembly is increased when the electricity need increases.

8. The high efficiency fuel cell system in accordance with claim 1, wherein the high efficiency fuel cell system is configured to output exhaust, wherein at least a portion of the exhaust output from the high efficiency fuel cell system is provided to an energy recovery generation system for heating high pressure gas from a gas distribution system before the high pressure gas is reduced in pressure using a turbine.

9. The high efficiency fuel cell system in accordance with claim 1, further comprising a water recovery assembly configured to recover water from one or more of: anode exhaust output from the topping anode portion, anode exhaust output from the bottoming anode portion and cathode exhaust output from the topping cathode portion.

10. The high efficiency fuel cell system in accordance with claim 1, further comprising one or more of:
an anode pressure booster configured to increase pressure of the anode exhaust output from the topping anode portion before the anode exhaust is conveyed to the bottoming anode portion; and
a cathode pressure booster configured to increase pressure of the cathode exhaust output from the bottoming cathode portion before the cathode exhaust is conveyed to the topping cathode portion.

11. The high efficiency fuel cell system in accordance with claim 10, further comprising a controller configured to control operation of the one or more of the anode pressure booster and the cathode pressure booster so as to control differential pressure between anode and cathode gas streams.

12. The high efficiency fuel cell system in accordance with claim 1, wherein the topping fuel cell assembly comprises direct internal reforming and the bottoming fuel cell assembly comprises direct internal reforming, and wherein the amount and spatial distribution of direct internal reforming catalyst in the fuel cells of the bottoming fuel cell assembly is different from the amount and spatial distribution of direct internal reforming catalyst in the fuel cells of the topping fuel cell assembly, and wherein a loading density of the direct internal reforming catalyst in the fuel cells of the bottoming fuel cell assembly gradually increases from an anode inlet region to an anode outlet region of the fuel cell.

13. The high efficiency fuel cell system in accordance with claim 2, wherein each fuel cell stack of the topping and bottoming fuel cell modules includes opposing anode inlet and outlet faces and opposing cathode inlet and outlet faces, and wherein one or more of:
(a) each fuel cell stack of the bottoming fuel cell module is configured so as to create a temperature gradient in an area adjacent the cathode inlet face of the fuel cell stack such that a temperature of cathode inlet gas is higher near the anode inlet face of the fuel cell stack than near the anode outlet face of the fuel cell stack;
(b) each fuel cell stack of the bottoming fuel cell module is configured so as to create a temperature gradient in an area adjacent the anode inlet face of the fuel cell stack such that a temperature of anode inlet gas is higher near the cathode inlet face of the fuel cell stack than near the cathode outlet face of the stack; and
(c) each fuel cell stack of the topping fuel cell module is configured so as to create a temperature gradient in an area adjacent the cathode inlet face of the fuel cell stack such that a temperature of cathode inlet gas is higher near the anode outlet face of the fuel cell stack than near the anode inlet face of the fuel cell stack.

14. The high temperature fuel cell system in accordance with claim 13, wherein the temperature gradient is between 10 and 20 degrees F.

15. The high efficiency fuel cell system in accordance with claim 1, further comprising:

an anode exhaust oxidizer assembly for oxidizing anode exhaust output from the bottoming anode portion;

wherein the bottoming fuel cell assembly comprises a heat exchanger configured to heat air using heat from the cathode exhaust output from the bottoming cathode portion, before the heated air is combined with oxidized anode exhaust gas output from the anode exhaust oxidizer assembly and the combined gas is conveyed to the bottoming cathode portion; and wherein the high efficiency fuel cell system further comprises a controller configured to adjust an amount of air supplied to the heat exchanger so as to control the temperature of the cathode exhaust output from the bottoming cathode portion that is conveyed to the topping cathode portion.

16. The high efficiency fuel cell system in accordance with claim 6, wherein:

the bottoming fuel cell assembly comprises one or more indirect internal reformers;

the supplemental fuel is first conveyed to the one or more indirect internal reformers and thereafter to the bottoming anode portion; and the anode exhaust output from the topping anode portion is conveyed directly to the bottoming anode portion without being conveyed through the one or more indirect internal reformers.

17. The high temperature fuel cell system in accordance with claim 13, wherein each fuel cell stack includes one or more baffles for controlling gas flow so as to form the temperature gradient.

* * * * *